United States Patent [19]

Jensen et al.

[11] 4,127,023
[45] Nov. 28, 1978

[54] ARTICLE TRANSFER MECHANISM

[75] Inventors: James W. Jensen; Stanley J. Miller, both of Hastings, Mich.

[73] Assignee: Gulf & Western Manufacturing Company, Southfield, Mich.

[21] Appl. No.: 834,228

[22] Filed: Sep. 19, 1977

[51] Int. Cl.² .................................... B21D 34/05
[52] U.S. Cl. ............................. 72/405; 72/421; 214/1 BB
[58] Field of Search ............ 72/405, 404, 421, 404; 214/1 BB

[56] References Cited

U.S. PATENT DOCUMENTS

| 912,601 | 2/1909 | Nilson | 72/405 |
|---|---|---|---|
| 2,964,159 | 12/1960 | Boyer | 214/1 BB |
| 3,057,312 | 10/1962 | Hatch | 72/421 |
| 3,135,395 | 6/1964 | Wallis | 214/1 BB |
| 3,655,070 | 4/1972 | Haydu | 214/1 BB |
| 3,754,667 | 8/1973 | Storch | 214/1 BB |
| 3,768,667 | 10/1973 | Paumier | 214/1 BB |
| 3,800,583 | 4/1974 | Miller | 72/405 |

FOREIGN PATENT DOCUMENTS 847,329 9/1960 United Kingdom ................ 214/1 BB
1,051,192 12/1966 United Kingdom ................ 214/1 BB Primary Examiner—C.W. Lanham
Assistant Examiner—Gene P. Crosby
Attorney, Agent, or Firm—Meyer, Tilberry & Body

[57] ABSTRACT

An article transfer mechanism is provided comprising parallel spaced apart feed plates reciprocable in the direction between the opposite ends thereof and carrying a plurality of laterally opposed article engaging feed finger members. Each feed finger member is supported for reciprocation laterally relative to the corresponding feed plate, and the feed plates support corresponding cam rods displaceable therewith and relative thereto in the direction of reciprocation of the feed plates. A cam and lever arrangement reciprocates the feed plates to displace the feed finger members longitudinally, and a second cam and lever arrangement reciprocates the cam rods to displace the feed finger members laterally inwardly and outwardly relative to the feed plates.

19 Claims, 6 Drawing Figures

FIG. 2

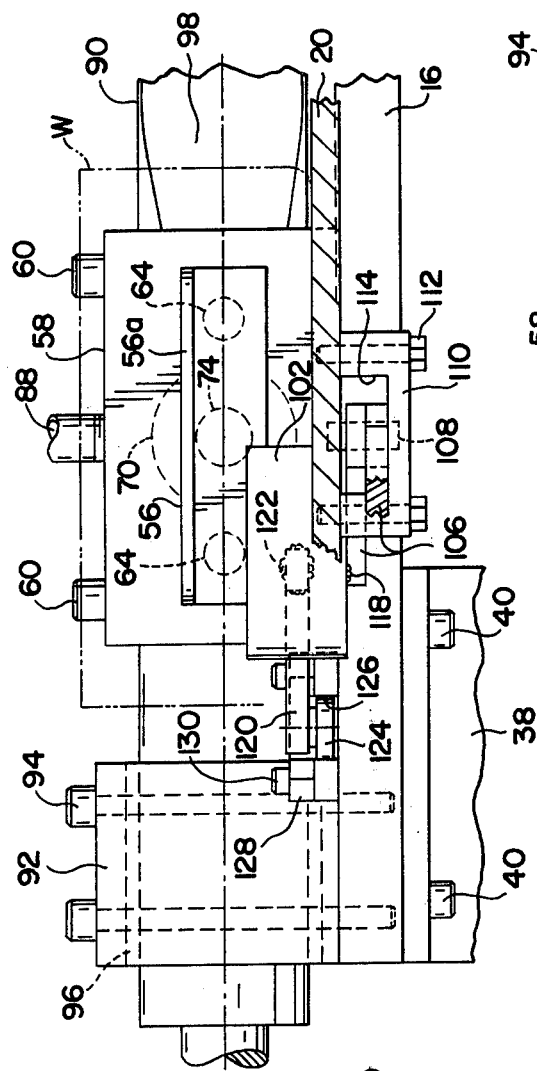
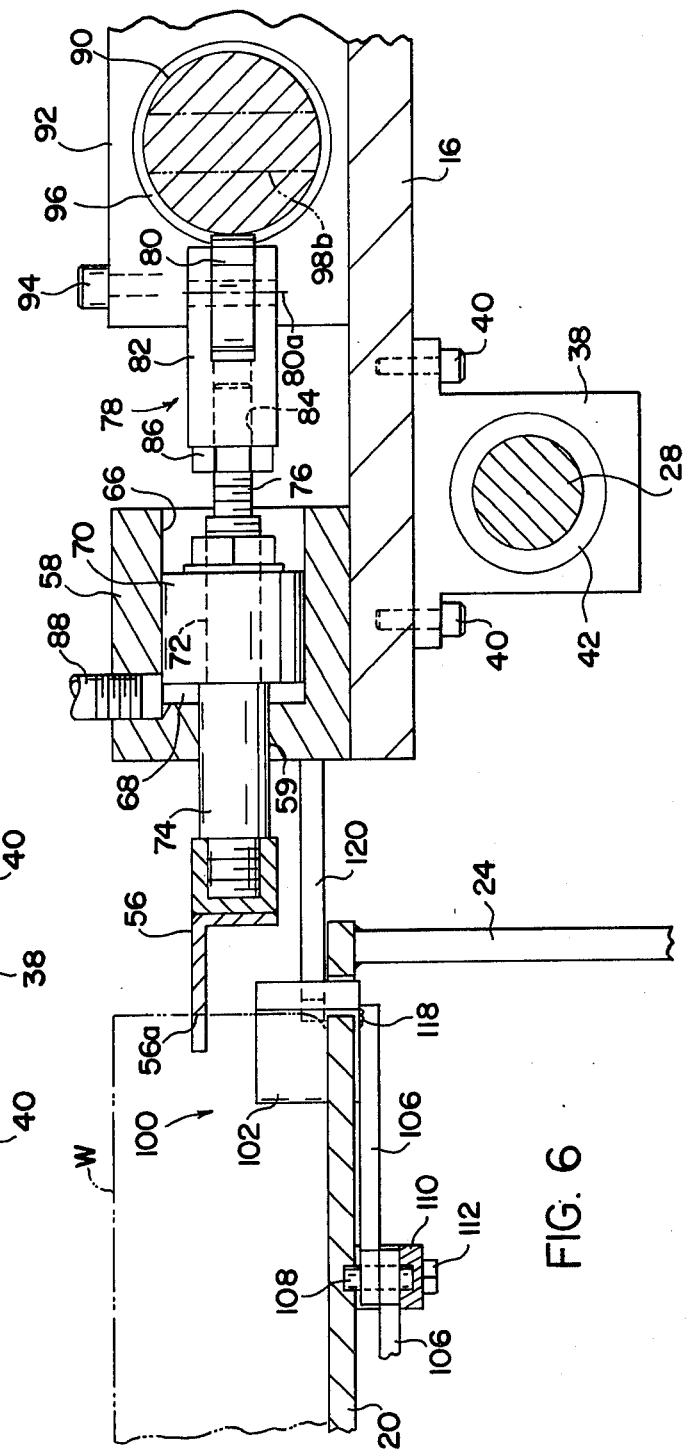
FIG. 5
FIG. 6

ARTICLE TRANSFER MECHANISM

This invention relates to the art of article transfer mechanisms and, more particularly, to a reciprocating article transfer mechanism for step advancing an article along a linear path.

The present invention finds particular utility in connection with the step-by-step advancement of a workpiece relative to a plurality of work stations in a metalworking press. Accordingly, the invention will be described with regard to such use. However, it will be appreciated that the invention has utility in connection with transferring articles other than press workpieces and in conjunction with apparatus other than presses.

Article transfer mechanisms have been provided heretofore for advancing workpieces step-by-step through a metalworking press such that a workpiece is engaged at one station, advanced to the next station and then released for the performance of work thereon by the press. Among such transfer mechanisms are those including a pair of longitudinally and laterally reciprocable feed bars having opposed pairs of cooperable feed fingers therebetween. The feed bars are adapted to be displaced laterally away from one another to release the fingers from engagement with a workpiece, displaced longitudinally in one direction to position another set of fingers in alignment with the workpiece, displaced laterally toward one another for the workpiece to be received between the new pair of fingers, and then advanced longitudinally in the opposite direction to move the workpiece to the next wolk station. Such movement is of course coordinated with the stroke of the press slide such that the engagement, transfer and release functions of the feed mechanisms take place during the non-working portion of the total stroke of the press. The feed bars of such prior mechanisms have been reciprocated longitudinally and laterally through the use of a variety of drive arrangements including cam and linkage assemblies, oscillating levers and linkage trains, and rack and pinion assemblies.

It has also been proposed heretofore to provide a step-by-step feed mechanism in which the feed bars are reciprocable longitudinally and the feed fingers are mounted on the feed bars for movement therewith and for lateral displacement relative thereto and toward and away from one another. Structurally complex rack and pinion and lever systems are required to achieve the desired combined movements and relative movements of the feed bars and feed fingers, whereby it is extremely difficult to obtain optimum coordination between the component parts of the feed mechanism and coordination of the feeding mechanism with operation of the press. Moreover, pivotal levers and rack and pinion arrangements limit the speed at which the feed mechanism can operate efficiently and thus do not enable obtaining an optimum high speed operation of the press and an optimum production rate for the press.

In addition to the foregoing disadvantages attendant to feed mechanisms heretofore provided, it has been necessary to provide a separate feed mechanism for each row or lane of workpieces to be transferred through the press. For example, a press for producing seamless metal can body blanks may be provided with two or more laterally adjacent rows or lanes defining work paths through the press. Each path includes a plurality of work stations, in sequence, at which a different forming operation is performed on a workpiece as it is stepped through the press. With such a press arrangement, it has been necessary heretofore to provide each lane with a separate feed mechanism each comprised of a pair of feed bars and associated feed fingers. Each feed mechanism has its own support structure and its own drive arrangement, whereby there is no interdependence in operation between laterally adjacent assemblies. Still further, larger presses can accommodate workpiece feed lanes and sequential work stations approaching the center line of the press from opposite sides thereof. With such an arrangement, a common conveyor for example is interposed between the discharge ends of the feed mechanisms at the center line of the press to receive the completed articles and convey the articles away from the the press. Heretofore, each of the opposed feed mechanisms has been an independent unit and there has been no interdependence between either the opposed mechanisms or the laterally adjacent mechanisms in an arrangement where a plurality of such opposed lanes are provided through the press. Thus, each feed assembly must be individually mounted on the press. It will be appreciated that the structural complexity of the feed mechanism together with the individuality thereof with respect to their association with the press results in a high cost of production and installation for the feed mechanism, and that the structural complexity results in a more than desirable frequency of shut-down of the press for maintenance purposes, all of which adds to the cost of production of articles by the press.

The present invention provides an improved feed mechanism of the character having reciprocating feed plates carrying workpiece engaging or feed finger members which are laterally displaceable relative to the feed plates. In accordance with the present invention, each of the feed finger members is supported for reciprocation relative to the corresponding feed plate and is displaced relative thereto by means of a cam which reciprocates longitudinally with and relative to the feed plate. Reciprocation of the feed finger member occurs during relative movement between the cam and feed plate. Preferably, the feed plate is reciprocated by means of a cam and lever arrangement at one end of the feed plate, and the cam for displacing the feed finger member is an elongate cam bar which is reciprocated with and relative to the feed plate by a corresponding cam and lever arrangement at the end of the feed plate. Further, in a laterally adjacent feed path arrangement at least one feed plate carries longitudinally aligned pairs of feed finger members projecting laterally outwardly from the opposite sides of the feed plate, and the corresponding cam bar is operable to simultaneously displace each pair of feed finger members relative to the feed plate. This interdependence between adjacent feed plates in such an arrangement enables two lanes of workpieces to be transferred through the press with a feed assembly comprised of just three reciprocating feed plates. Moreover, additional lanes can be provided by adding one feed plate assembly for each additional lane. Accordingly, the structural interrelationship and interdependence between adjacent feed plate assemblies enables a reduction in component parts in connection with providing a given number of workpiece transfer lanes through a press.

Preferably, each reciprocating feed plate is supported by a pair of longitudinally extending rods therebeneath. One of the rods is attached to the feed plate and is slidable relative to bearings fixed with respect to the press, and the other rod is fixed to the press and the plate is slidable relative thereto by means of bearings mounted on the plate. The rod attached to the feed plate enables the plate to be reciprocated by means of a cam and lever arrangement at one end of the feed plate, and the corresponding cam bar is preferably recirpocated by means of a corresponding cam and lever arrangement at the one end of the feed plate. The support and drive arrangement for the feed plate advantageously enables a structural interrelationship and interdependence to be established between opposed pairs of feed plates on opposite sides of the press in an arrangement for delivering articles along opposed paths leading inwardly of the press from opposite sides thereof. In this respect, one pair of guide rods is provided for each pair of opposed feed plates, and the rods support the two plates for relative reciprocation with respect to one another.

In accordance with another aspect of the present invention, the feed plate arrangement enables the use of a unique workpiece locating assembly at the input end of the transfer mechanism for positioning a workpiece with respect to the feed finger members which first engage and transfer the article inwardly of the press.

It is accordingly an outstanding object of the present invention to provide an improved article transfer mechanism of the character comprising longitudinally reciprocable feed members carrying opposed pairs of article engaging members which are laterally reciprocable relative to the feed members.

Another object is the provision of a feed mechanism of the foregoing character having an improved structural arrangement for supporting and displacing the article engaging members relative to the feed members.

Yet another object is the provision of a feed mechanism of the foregoing character including a unique feed member assembly which enables establishing a structural interdependence between laterally adjacent feed member assemblies to provide two or more laterally adjacent feed lanes with fewer components than heretofore required.

A further object is the provision of a feed mechanism of the foregoing character having an improved support and drive arrangement for the component parts thereof.

Still a further object is the provision of a feed mechanism of the foregoing character which enables establishing a structural interdependence between longitudinally opposed feed members, thus to minimize component parts and installation time with respect to an arrangement for feeding articles along paths converging toward a center point therebetween.

Yet a further object is the provision of a press feed mechanism which is structurally simple and comprised of a minimum number of component parts structurally interrelated to provide a smooth and efficient operation of the mechanism, and which enables high speed press operation with minimum wear of the component parts of the feed mechanism and maximum accuracy with regard to coordinating relative movement between the component parts in connection with press operation.

The foregoing objects, and others, will in part be obvious and in part pointed out more fully hereinafter in conjunction with the written description of the accompanying drawings illustrating a preferred embodiment of the invention and in which:

FIG. 2 is a sectional elevation view of the mechanism taken along line 2—2 in FIG. 1;

FIG. 5 is a sectional elevation view taken along line 5—5 in FIG. 4; and,

FIG. 6 is a sectional elevation view taken along line 6—6 in FIG. 4.

Figure 1:
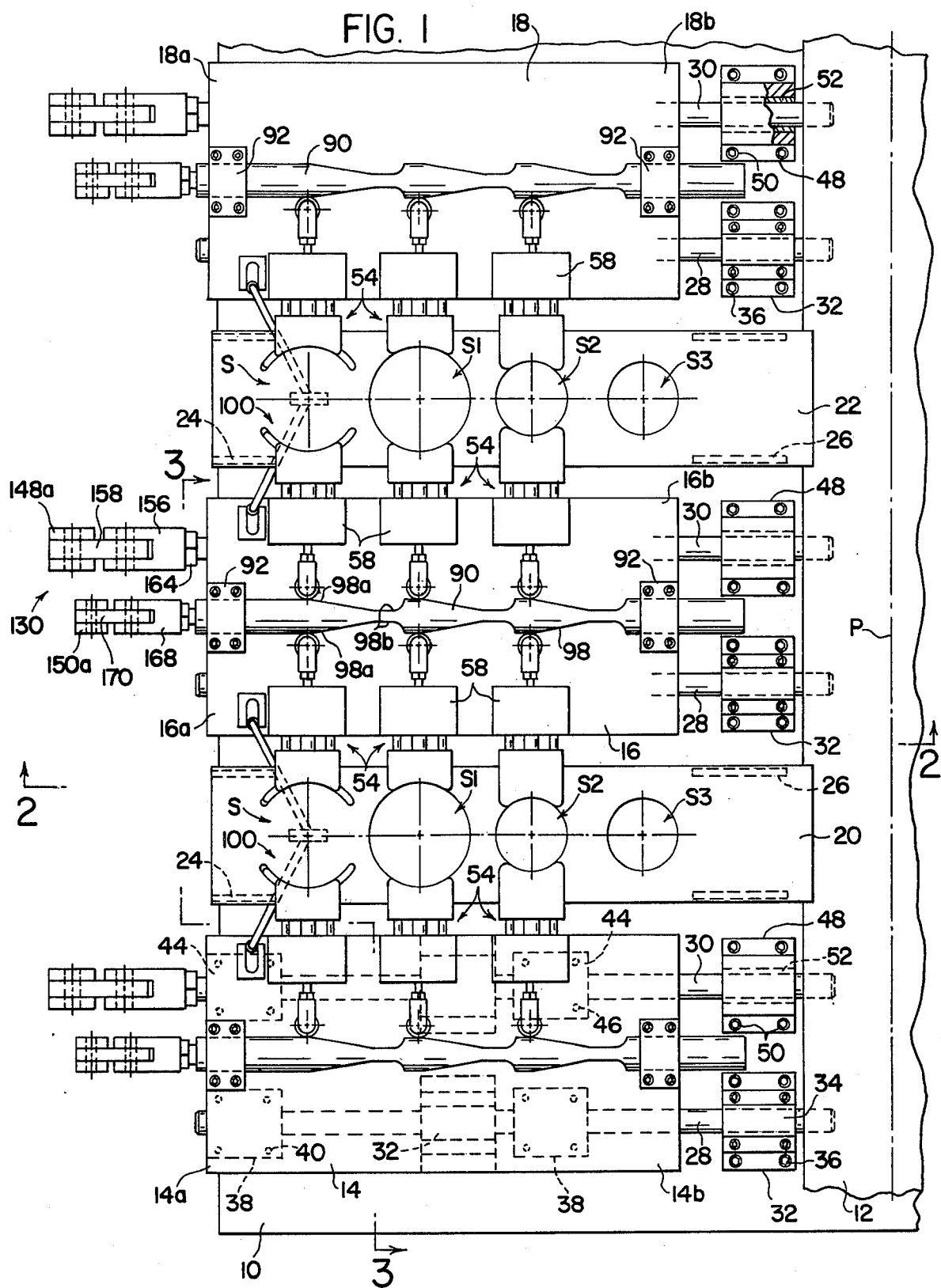
FIG. 1 is a plan view of a two lane feed mechanism according to the present invention shown in association with a press bed.

Referring now in greater detail to the drawings wherein the showings are for the purpose of illustrating a preferred embodiment of the invention only and not for limiting the invention, a two lane article transfer mechanism is shown in FIG. 1 in association with a press bed 10. As will become apparent hereinafter, the mechanism is adapted to deliver articles step-by-step from one side of the press toward an article discharge conveyor 12 at the center line P of the press. In order to provide two article transfer lanes, the transfer mechanism is comprised of three feed plates 14, 16 and 18 having outer or input ends 14a, 16a and 18a adjacent the side of the press, and inner or discharge ends 14b, 16b and 18b adjacent conveyor belt 12. Feed plates 14 and 16 are parallel and laterally spaced apart, and a support surface plate 20 is disposed therebetween and extends from the side of the press to a position slightly overlapping conveyor belt 12. Similarly, feed plates 16 and 18 are parallel and laterally spaced apart and a support surface plate 22 similar to plate 20 is disposed therebetween.

The feed plates and support surface plates are supported in the manner described hereinafter above and parallel to the press bed 10, and support surface plates 20 are aligned with a plurality of work stations of the press spaced apart in the direction between the side of the press and conveyor belt 12. In the embodiment illustrated, three such work stations are shown in each feed lane and designated generally by the letters S1, S2 and S3. It will be appreciated that cooperable die tools, not shown, are supported by the press bed and slide at each of these stations for performing a desired forming operation with respect to a workpiece positioned at each station. Additionally, the transfer mechanism provides a workpiece receiving and orienting station S adjacent the outer end of each of the support plates and at which a workpiece to be transferred along the corresponding feed lane is received and properly oriented for transfer by the mechanism. It will be further appreciated from the description hereinafter that workpieces are received at stations S and sequentially advanced step-by-step to work stations S1, S2 and S3 and thence onto conveyor 12.

Figure 2:
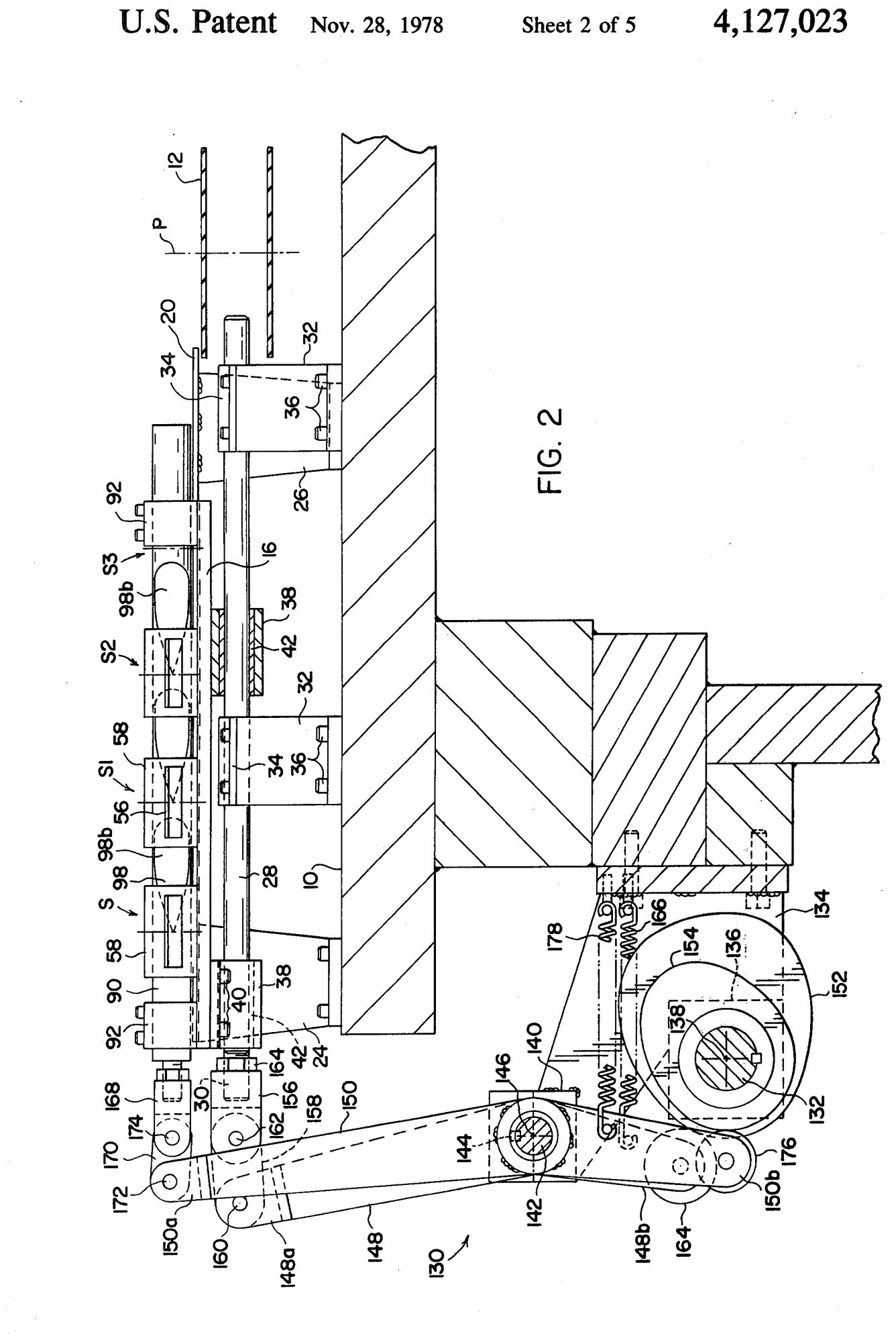
Figure 3:
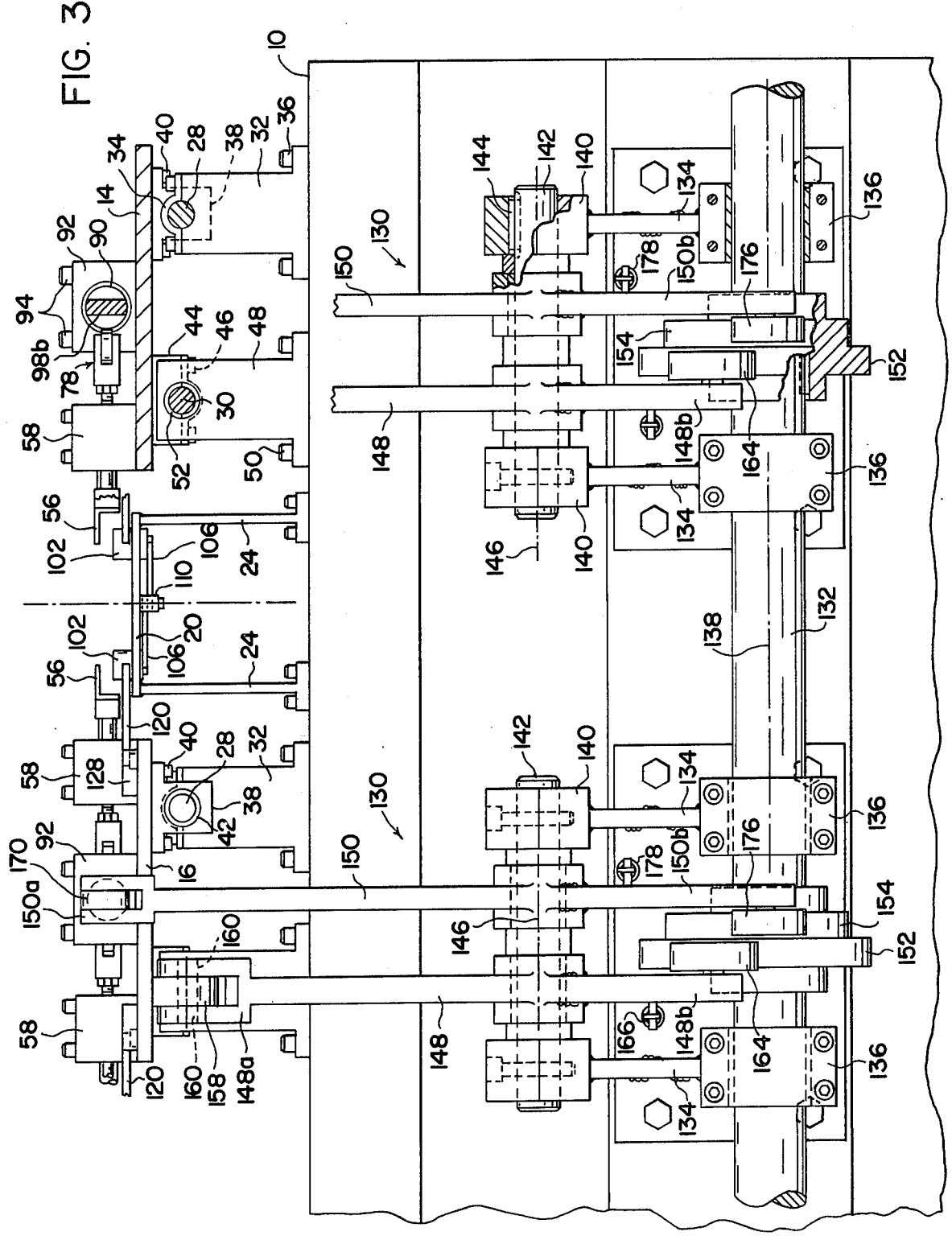
FIG. 3 is a sectional elevation view of the mechanism taken along line 3—3 in FIG. 1.

As best seen in FIGS. 2 and 3, support surface plates 20 and 22 are each rigidly supported relative to the press bed such as by means of corresponding support brackets 24 and 26 adjacent the outer and inner ends thereof, respectively. Brackets 24 and 26 can have their upper ends welded or otherwise suitably secured to the corresponding surface plate, and the lower ends of the brackets can be bolted or otherwise secured to the press bed or frame. Each feed plate 14, 16 and 18 overlies a corresponding pair of guide rods 28 and 30 extending longitudinally of the feed plate and parallel thereto and to one another. Each guide rod 28 is attached to press bed 10 against displacement relative thereto such as by means of support blocks 32 having their upper ends secured to rod 28 such as by a clamping arrangement 34 and having their lower ends attached to press bed 10 such as by threaded fasteners 36. Each feed plate is slidably interengaged with the corresponding guide rod 28 by means of a pair of bearing block assemblies 38 secured to the underside of the feed plate such as by threaded fasteners 40 and having corresponding bearings 42 slidably receiving rod 28. Each guide rod 30 is attached to the corresponding feed plate for reciprocating movement therewith and is supported by the press bed for reciprocation relative thereto. In this respect, rod 30 is attached to the underside of the corresponding feed plate at opposite ends of the latter by means of a pair of mounting brackets 44 attached to the feed plate such as by threaded fasteners 46 so as to clampingly interengage rod 30 with the feed plate. Reciprocable support of rod 30 relative to the press bed is achieved by means of a pair of bearing block assemblies 48 having their lower ends fastened to press bed 10 such as by threaded fasteners 50 and having bearings 52 at their upper ends slidably receiving rod 30. It will be appreciated from the foregoing description that longitudinal displacement of rod 30, in the manner set forth hereinafter, imparts longitudinal reciprocation to the corresponding feed plate and guide rod 28 relative to the press bed.

The laterally opposite sides of feed plate 16 and the laterally inner sides of feed plates 14 and 18 are provided with laterally aligned feed finger assemblies 54 at positions along the lengths of the feed plates corresponding to the positions of stations S, S1, S2 and S3. Each feed finger assembly 54 is structurally identical and, accordingly, it will be understood that the following description of one of the assemblies is applicable to the others. In this respect, and with reference in particular to FIGS. 4–6, feed finger assembly 54 includes a feed finger member 56 supported for reciprocation laterally inwardly and outwardly relative to the corresponding side edge of feed plate 16. Feed finger member 56 is in the form of a plate parallel to the plane of the feed plate and having an outer edge 56a contoured for mating engagement with the outer periphery of a workpiece W to be transferred thereby.

Feed finger member 56 is supported for reciprocation by means of a support block 58 attached to feed plate 16 by means of a plurality of threaded fasteners 60. The support block includes a pair of openings 62 extending laterally therethrough, and feed finger member 56 is attached to the outer ends of a pair of guide rods 64 each slidably received in a corresponding one of the openings 62 in support block 58. Support block 58 is further provided with an opening 66 extending laterally thereinto from the inner end of the block and defining a piston chamber 68 adapted to receive a laterally reciprocable piston 70 mounted on a piston rod 72. The outer end 74 of piston rod 72 extends through an opening 59 in mounting block 58 at the inner end of chamber 68 and is threadedly attached to feed finger member 56, and the inner end 76 of the piston rod is threaded to adjustably receive a cam follower roller assembly 78 by which the feed finger is reciprocated laterally as described more fully hereinafter.

Follower roller assembly 78 includes a roller element 80 mounted on a follower block 82 for rotation about a roller axis 80a perpendicular to the plane of feed plate 16. Follower block 82 is provided with a threaded aperture 84 receiving the threaded end 76 of piston rod 72, thus enabling adjustment of the position of follower roller 80 axially with respect to the piston rod. A clamping nut 86 operates to lock the follower roller in a desired position relative to the piston rod. Support block 58 is provided with a passageway 88 opening into piston chamber 68 at the inner end thereof, and passage 88 is adapted to be connected to a suitable source of air under pressure, not shown, which operates to bias piston 70 and thus feed finger member 56 laterally inwardly with respect to the corresponding side of feed plate 16. It will be appreciated that the foregoing arrangement provides for feed finger member 56 to reciprocate with feed plate 16 in the longitudinal direction thereof and to be reciprocated relative to feed plate 16 in the direction laterally thereof.

As best seen in FIGS. 1 and 2, each of the feed plates 14, 16 and 18 is provided with a corresponding cam rod 90 operable as set forth hereinafter to laterally displace feed finger members 56 on the corresponding feed plate. Each cam rod 90 extends longitudinally of the corresponding feed plate and is supported thereby for reciprocation therewith and for longitudinal reciprocation relative to the feed plate. In this respect, the longitudinally opposite ends of each cam rod 90 are longitudinally slidably supported by bearing block assemblies 92 mounted on the upper surface of the corresponding feed plate. Bearing block assemblies 92 are attached to the feed plates such as by means of threaded fasteners 94 and have suitable bearings 96 slidably receiving the ends of the corresponding cam rod 90. Each cam rod 90 is provided along its length with a plurality of cam tracks 98 each operatively associated with cam roller 80 of a corresponding one of the feed finger assemblies 54. Thus, in the embodiment shown, cam rod 90 on feed plate 16 is provided with laterally opposed pairs of cam tracks 98 associated with the laterally aligned pairs of feed finger assemblies on feed plate 16. While the cam rods 90 on feed plates 14 and 18 are shown as having laterally opposed pairs of cam tracks 98, it will be appreciated that each of these cam rods need only be provided with cam tracks facing the laterally inner side edge of the corresponding feed plate. At the same time, it will be appreciated that feed plate, feed finger assembly and cam rod arrangement advantageously enables additional feed lanes to be added thereto by mounting feed finger assemblies 54 along the outer edges of feed plates 14 and 18 and mounting an additional feed plate, feed finger assemblies and cam rod laterally adjacent one or the other or both of the feed plates 14 and 18.

Figure 4:
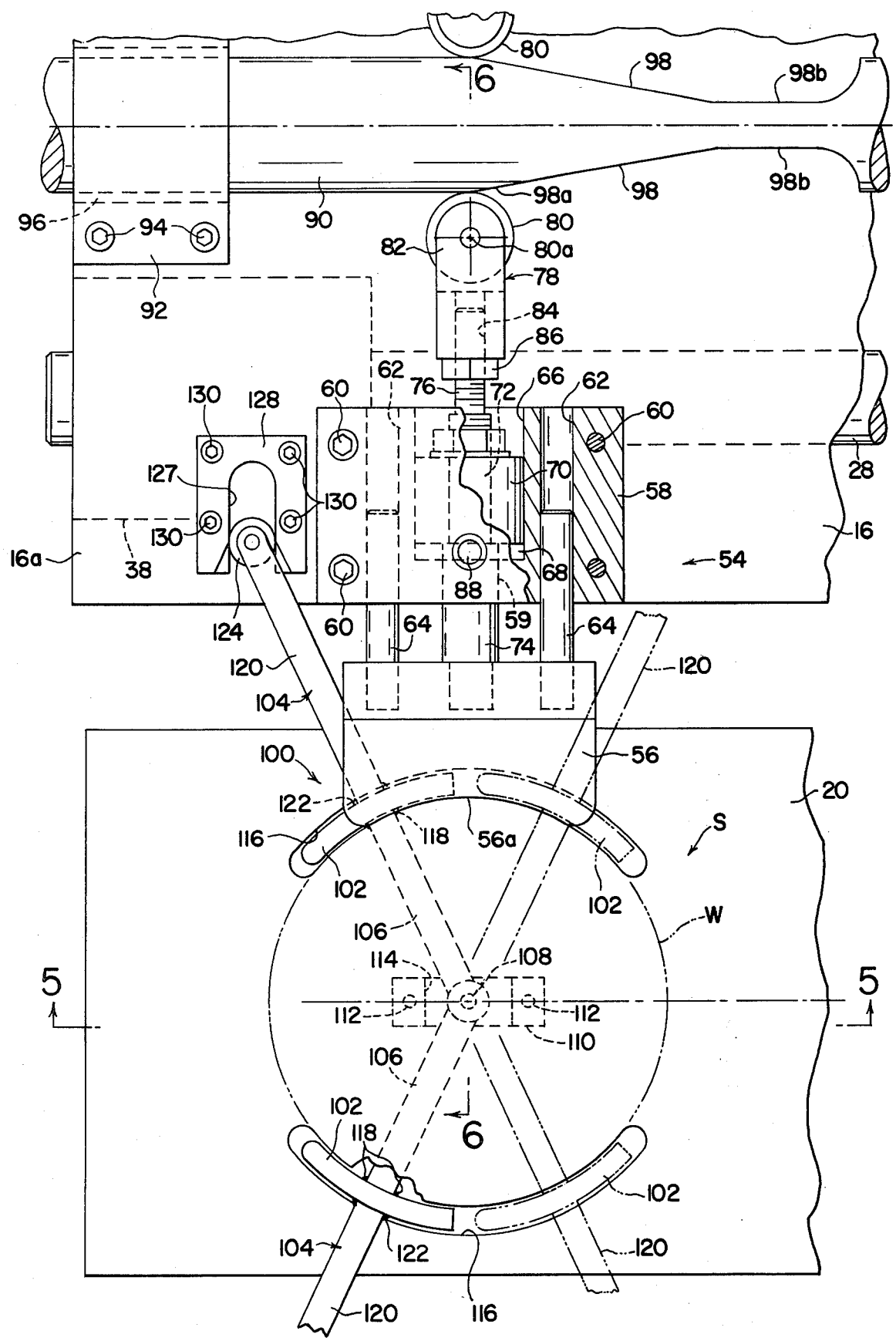
FIG. 4 is an enlarged detail plan view of the input end of a portion of the transfer mechanism.

In the embodiment shown, cam rods 90 are circular and cam tracks 98 are defined by wedge-shaped recesses machined or otherwise provided in the rod. Each cam track 98, as best seen in FIGS. 1 and 4, has an outer end 98a terminating at the outer surface of the rod and cooperable with a corresponding follower roller 80 to provide maximum lateral displacement of the corresponding feed finger member laterally outwardly with respect to the side edge of the corresponding feed plate. Each cam track 98 is inclined longitudinally from outer end 98a to an inner end 98b spaced inwardly from the outer surface of the cam rod and cooperable with the corresponding follower roller 80 to define the laterally innermost position of the corresponding feed finger member relative to the side edge of the feed plate. It will be appreciated that the bias provided by air under pressure in piston chamber 68 maintains the corresponding follower roller 80 in engagement with the corresponding cam track 98 during reciprocation of cam rod 90 in longitudinally opposite directions relative to the feed finger assembly and feed plate. It will be further appreciated that longitudinal displacement of the cam rod with the corresponding feed plate maintains the feed finger members in a lateral position relative to the feed plate corresponding to the relative positions of the cam rod and follower rollers.

From the foregoing description, it will be appreciated that the positions of the component parts of the transfer mechanism shown in FIG. 1 provide for the feed finger members 56 to be in the laterally outermost positions thereof relative to the side edges of the corresponding feed plate so that laterally opposed ones of the feed finger members engage a workpiece therebetween. When the feed plates and cam rods are then displaced together in the direction longitudinally inwardly of the press, the feed finger members operate to advance the workpiece therebetween to the next station along the feed line, the innermost workpiece being transferred onto conveyor 12. After the feed plates and cam rods are advanced in this manner, the cam rods are displaced longitudinally relative to the feed plates in the direction outwardly of the press, whereby follower rollers 80 move along the cam tracks from ends 98a towards ends 98b so that feed finger members 56 are displaced laterally inwardly of the corresponding feed plate and away from the workpiece therebetween. Once the fingers have cleared the corresponding workpiece, the feed plate and cam rods can be displaced together longitudinally outwardly of the press with follower rollers 80 engaging the cam tracks toward ends 98b thereof so as to maintain clearance with respect to the workpieces during such outward movement of the feed plates. This of course returns the feed finger members to the preceding station, and at this time cam rods 90 are again advanced longitudinally relative to the feed plates and inwardly of the press so that follower rollers 80 ride along the cam tracks towards ends 98a thereof to displace feed finger members 56 laterally outwardly of the corresponding feed plate into engagement with the workpiece now at the preceding station.

It will be appreciated that after a workpiece is advanced from station S to station S1 a new workpiece will be conveyed to station S so as to be picked up and advanced along the feed path during the subsequent cycle of operation of the feed mechanism. Such a workpiece can be transferred to station S by any suitable conveyor mechanism, not illustrated, and in accordance with a further aspect of the present invention, the feed mechanism is provided with a workpiece orienting assembly 100 at station S. Orienting assembly 100 is operable during the advance and return strokes of the feed plates to correctly position the workpiece at station S for engagement by the feed finger members 56 upon lateral outward displacement thereof at station S. An orienting mechanism 100 is provided for each of the support surface plates 20 and 22, and the structure and operation of mechanisms 100 are identical. Accordingly, only the mechanism shown in conjunction with support surface plate 20 will be described in detail.

With reference to FIGS. 1, 3, and 4–6, orienting mechanism 100 includes a pair of guide plates 102 contoured in accordance with the outer contour of the workpiece W and each of which is mounted on a corresponding pivotal arm assembly 104 and between the opposite ends of the arm assembly. Each arm assembly 104 includes a first arm portion 106 having an inner end pivotally connected to the underside of support surface plate 20 by means of a common pin 108 and a support bracket 110. Support bracket 110 is mounted on support surface plate 20 such as by means of threaded fasteners 112 and includes a window 114 receiving the ends of arms 106 in overlapping relationship. Each guide plate 102 extends upwardly through a corresponding arcuate slot 116 in support surface plate 20, and the lower end of the guide plate overlies the outer end of arm portion 106 and is suitably secured thereto such as by welds 118. Each arm assembly 104 further includes an arm portion 120 disposed above support surface plate 20 and having its inner end secured to the corresponding guide plate 102 intermediate the lower and upper ends thereof such as by means of welds 122. The outer end of each arm portion 120 is provided with a guide roller 124 received in a guide slot 126 provided by a U-shaped bracket 128 which is suitably fastened to the upper surface of the corresponding one of the feed plates 14 and 16 such as by means of threaded fasteners 130.

With the component parts in the positions illustrated in FIG. 1, in which as described hereinabove the transfer mechanism is prepared to advance workpieces longitudinally inwardly of the press, guide plates 102 are positioned somewhat behind the lateral center line of the workpiece W as shown in FIG. 4. Accordingly, displacement of feed plates 14 and 16 longitudinally inwardly of the press enables feed finger members 56 to displace the workpiece along the feed path without interference with guide plates 102. It will be noted too that the workpiece engaging ends of feed finger members 56 are disposed above guide plates 102 to avoid interference therewith. As feed plates 14 and 16 move longitudinally inwardly of the press carrying guide brackets 128 therewith, rollers 124 engage guide slots 126 and move inwardly thereof whereby arm assemblies 104 are pivoted about the axis of pin 108 in the direction longitudinally inwardly with respect to support surface plate 20. When feed plates 14 and 16 have completed their advancement longitudinally inwardly of the press, guide plates 102 are in the broken line positions thereof shown in FIG. 4. At or just prior to this time a new workpiece W is transferred onto the outer end of support surface plate 20 and against guide plates 102 which stop and thus position the workpiece at station S. During return movement of feed plates 14 and 16 longitudinally outwardly of the press, guide plates 102 are pivoted back to their original positions through the interengaging relationship between rollers 124 and guide slots 126. Such displacement of the guide plates does not disturb the workpiece and thus the latter is accurately positioned for engagement by feed finger members 56 when feed plates 14 and 16 reach the longitudinally outer positions thereof and the feed finger members are displaced laterally outwardly of the corresponding feed plate for engagement with the workpiece.

As best seen in FIGS. 1, 2 and 3, feed plates 14, 16 and 18 and cam rods 90 are adapted to be longitudinally reciprocated to achieve the desired displacements thereof by a cam and lever arrangement 130 mounted on the press frame adjacent the longitudinally outer ends of the feed plates and cam rods. More particularly, with reference to the latter FIGURES, a cam shaft 132 is mounted on the press frame by means of pairs of mounting brackets 134 and corresponding bearing blocks 136 for rotation about an axis 138 extending laterally of feed plates 14, 16 and 18 and parallel to the plane thereof. Each mounting bracket 134 also supports a mounting block 140 which is apertured for each pair of mounting blocks 140 to receive and support a lever shaft 142. Each shaft 142 is interengaged with the mounting blocks against rotation relative thereto such as by means of keys 144 and has an axis 146 parallel to axis 138. Each lever shaft 142 pivotally supports a pair of levers 148 and 150 adjacent the outer end of the corresponding one of the feed plates 14, 16 and 18 and cam shaft 132 is provided with a pair of cams 152 and 154 respectively for levers 148 and 150 of each set of levers.

Each lever 148 has an upper end 148a coupled with the outer end of guide rod 20 by means of a coupling member 156 attached to rod 30 and a link member 158 having its opposite ends pivotally interconnected with lever 148 and coupling member 156 by pins 160 and 162, respectively. Preferably, the outer end of rod 30 and the corresponding end of coupling member 156 are threadedly interengaged to enable longitudinal adjustment therebetween, and a lock nut 164 is provided on rod 30 to lock the coupling member in position relative to the rod. Lower end 148b of lever 148 is provided with a follower roller 164 engaging the outer periphery of cam 152, and a biasing spring 166 is attached to lever 148 below axis 146 and to the press frame to bias follower roller 164 into engagement with cam 152.

Each lever 150 has an upper end 150a coupled with the outer end of the corresponding cam rod 90 by means of a coupling member 168 mounted on the cam rod and a link member 170 having its opposite ends pivotally interconnected with lever 150 and coupling member 168 by means of pins 172 and 174, respectively. Preferably, coupling member 168 is adjustably interengaged with cam rod 90 in a manner similar to the adjustable interconnection between coupling member 156 and guide rod 30. Lower end 150b of lever 150 is provided with a follower roller 176 which engages the outer periphery of cam 154, and a biasing spring 178 has its opposite ends connected to lever 150 below axis 146 and to the press frame so as to bias follower roller 176 into engagement with the outer periphery of cam 154.

In response to rotation of shaft 132 cams 152 and 154 are rotated about axis 138 to oscillate levers 148 and 150 about axis 146, thus to reciprocate the corresponding feed plate and cam rod in the manner described hereinabove. It will be appreciated that the contours of cams 152 are such that the feed plates are reciprocated simultaneously in coordination with the press slide displacement and a longitudinal distance corresponding to the distance between adjacent ones of the work stations of the press. Likewise, it will be appreciated that the contours of cams 154 are such that the cam rods 90 reciprocate with and relative to the feed plates to achieve the desired displacement of the feed finger members laterally of the feed plates. While an individual set of cams and levers is illustrated for each of the feed plates 14, 16 and 18 it will be appreciated that the desired lever actuation could be achieved with a single set of cams. In this respect, for example, corresponding ones of the levers of each set could be interconnected with one another by cross ties, whereby pivotal movement of one of the levers of the set would cause pivotal movement of the corresponding levers of the other sets.

While the embodiment herein illustrated and described provides for workpieces to be transferred from one side of the press to a conveyor located centrally of the press, it will be appreciated that the latter location could be representative of the opposite side of the press whereby the articles would be transferred from one side of the press to the other. It will be further appreciated that the longitudinal lengths of the support surface plates, feed plates, feed plate guide rods and cam rods could be increased, and additional feed finger assemblies provided on the feed plates to enable transfer of workpieces to more than the three work stations disclosed herein, or to transfer the workpieces from one side of the press to the other.

White it is possible to mount transfer mechanisms of the structure herein described on opposite sides of a press for feeding workpieces from each side thereof toward a conveyor located centrally of the press, the feed plate and guide rod arrangement according to the present invention advantageously enables a structural interrelationship between such opposed transfer mechanisms which provides for unitary support of the opposed feed plates in each feed line. In this respect, with reference to FIGS. 1, 2 and 3 and with reference to feed plate 16, for example, the lengths of feed plate guide rods 28 and 30 would each be increased to extend to the opposite side of the press. Both guide rods would be supported along the lengths thereof for reciprocation relative to the press bed by bearing block assemblies similar to assemblies 48 described herein in conjunction with guide rod 30 and feed plate 16. Feed plate 16 would be interengaged with guide rod 28 for reciprocating movement relative thereto in the manner described herein and would be attached to guide rod 30 for reciprocation therewith in the manner described herein. The opposed feed plate would be of a length corresponding to that of feed plate 16 and would carry a cam rod and feed finger assembly identical to those of feed plate 16. Further, the opposed feed plate would be attached to the extended portion of guide rod 28 for reciprocation therewith such as by clamping assemblies similar to assemblies 44 described herein in connection with guide rod 30 and feed plate 16. Further, the opposed feed plate would be interengaged with the extended portion of guide rod 30 for reciprocation relative thereto such as by means of bearing block assemblies 38 described herein in connection with guide rod 28 and feed plate 16. The side of the press opposite the side shown in FIGS. 1 and 2 would be provided with a cam and lever arrangement 130 of the structure shown in FIG. 3. Lever 150 of this cam and lever arrangement would be interconnected with the cam rod of the opposed feed plate for reciprocating the cam rod with and relative to the opposed feed plate, and lever 148 of this cam and lever arrangement would be interconnected with the corresponding end of guide rod 28 in the manner shown in FIG. 2 with respect to guide rod 30. It will be appreciated that this arrangement provides for both of the guide rods 28 and 30 to be reciprocated relative to the press bed in the direction between the opposite sides of the press. More particularly, rod 30 reciprocates feed plate 16 in the latter direction and relative to guide rod 28, and guide rod 28 reciprocates the opposed feed plate in the latter direction and relative to guide rod 30. Accordingly, a single set of guide rods supports an opposed pair of feed plates and facilitates assembly and disassembly of opposed feed lane units relative to the press bed.

White considerable emphasis has been placed herein on the specific structure and structural interrelationship between the component parts of the feed mechanism of the preferred embodiment, it will be appreciated that many changes can be made in the embodiment disclosed without departing from the principles of the present invention. For example, while it is preferred to bais feed finger members 56 of the feed finger assemblies laterally inwardly of the corresponding feed plate by means of air under pressure, the feed finger members could be spring biased in the desired direction. Still further, as an alternative to air or spring bias the feed plate, cam rod and cam follower roller structure could be modified for the follower rollers 80 to be positively driven both inwardly and outwardly of the feed plate. For example, rollers 80 could be laterally captured between the corresponding cam track 98 and a cam plate on the corresponding feed plate parallel to the cam track 98. Similarly, it will be appreciated that cams 152 and 154 of the cam and lever assembly 130 could be provided with cam recesses in the sides thereof receiving follower rollers on the lever members so that pivotal movement of the levers in opposite directions is positive, thus eliminating the necessity of biasing springs for the levers as described herein. These and other modifications will be suggested upon reading and understanding the foregoing description of the preferred embodiment.

Since many embodiments of the present invention can be made, and since many changes can be made in the embodiment herein illustrated and described without departing from the principles of the present invention, it is to be distinctly understood that the foregoing descriptive matter is to be interpreted merely as illustrative of the present invention and not as a limitation.

What is claimed is:

1. An article transfer mechanism including parallel spaced apart feed members having opposite ends, means supporting said feed members for reciprocation in the direction between said opposite ends, an article engaging member on each feed member, said article engaging members having opposed article engaging ends, means supporting each article engaging member for reciprocation relative to the corresponding feed member to displace said article engaging ends laterally inwardly and outwardly of the space between said feed members, cam means, means supporting said cam means for reciprocation in said direction with and relative to said feed members, follower means between said cam means and each said article engaging members for reciprocating said article engaging members in response to reciprocation of said cam means relative to said feed members, and means to reciprocate said feed members and said cam means.

2. The article transfer mechanism according to claim 1, and means biasing said follower means toward said cam means.

3. The article transfer mechanism according to claim 1, wherein said means supporting said feed members for reciprocation includes a support rod attached to each said feed member and fixed bearing means slidably receiving each said support rod, said cam means for reciprocation including bearing means on said feed members slidably receiving the corresponding cam rod, said support rods and said cam rod each having a driven end, and said means for reciprocating said feed members and said cam means including rotatable cam means and follower means interengaging said rotatable cam means and said driven ends.

4. The article transfer mechanism according to claim 1, wherein said cam means includes a cam rod on each feed member, said means supporting said cam means for reciprocation including bearing means on said feed members slidably receiving the corresponding cam rod.

5. The article transfer mechanism according to claim 4, wherein said follower means includes reciprocable plunger means having one end engaging the outer surface of the corresponding cam rod and having a second end interconnected with the corresponding article engaging member.

6. The article transfer mechanism according to claim 5, and means biasing said one end of said plunger means toward said corresponding cam rod.

7. The article transfer mechanism according to claim 5, wherein said means supporting said article engaging member includes chamber means and said plunger means includes piston means slidably received in said chamber means, said chamber means including an inlet for fluid under pressure to bias said one end of said plunger means toward said corresponding cam rod.

8. The article transfer mechanism according to claim 1, and article locating means in the space between said feed members for locating an article longitudinally and laterally relative to said article engaging members, said locating means being displaceable between first and second positions respectively for locating an article relative to said article engaging members and releasing said article for transfer by said article engaging members, and means for displacing said locating means between said first and second positions.

9. The article transfer mechanism according to claim 8, wherein said locating means includes locating members and said means to displace said locating means includes means interconnecting said locating members with said feed members to displace said locating members in response to reciprocation of said feed members.

10. An article transfer mechanism comprising coplanar laterally spaced apart feed plates having laterally opposed inner edges and opposite ends, means supporting said plates for reciprocation in the direction between said opposite ends, a plurality of pairs of opposed article engaging members longitudinally spaced apart along said inner edges of said feed plates and having article engaging ends facing inwardly of said inner edges, means on said plates supporting said members for reciprocation laterally inwardly and outwardly with respect to said inner edges, cam means on each said feed plate extending in the direction between said opposite ends and supported on the corresponding plate for reciprocation therewith and relative thereto in said direction, said cam means including cam track means for each article engaging member on the corresponding plate, cam follower means for each article engaging member having a first end connected to the article engaging member and a second end engaging the corresponding cam track means, whereby reciprocation of said cam means relative to said plates reciprocates said opposed pairs of article engaging members toward and away from one another, means to reciprocate said plates together, and means to reciprocate said cam means together.

11. The article transfer mechanism according to claim 10, wherein each said cam means is a cam rod.

12. The article transfer mechanism according to claim 10, wherein each said follower means includes a follower rod reciprocably supported by the means supporting the corresponding article engaging member for reciprocation, and means biasing said follower means toward said cam means.

13. The article transfer mechanism according to claim 12, wherein each said cam means is a cam rod spaced laterally outwardly of said means supporting said article engaging members on the corresponding feed plate.

14. The article transfer mechanism according to claim 13, wherein said biasing means is defined by piston means on said follower rod and means providing a cylinder receiving said piston means in said means supporting the corresponding article engaging member, said cylinder including an inlet port for fluid under pressure.

15. The article transfer mechanism according to claim 13, wherein said means to reciprocate said feed plates includes first rotatable cam means and follower means engaging said first cam means and connected to one of said opposite ends of said feed plates, said cam rods having opposite ends, and said means to reciprocate said cam means including second rotatable cam means and follower means engaging said second cam means and connected to one of said opposite ends of each said cam rod.

16. The article transfer mechanism according to claim 15, and a pair of article locating members in the space between said feed plates, means supporting said locating members for pivotal movement about an axis perpendicular to said feed plates and laterally aligned with one of said pairs of article engaging members, and means interconnecting each said locating members with a different one of said feed plates for pivoting said locating members about said axis in response to reciprocation of said feed plates.

17. The article transfer mechanism according to claim 16, wherein said means interconnecting said locating members with said feed plates includes a lever attached to each said locating member and having an end slidably and pivotally interengaged with the corresponding feed plate.

18. The article transfer mechanism according to claim 10, wherein said means supporting said article engaging member includes chamber means and said plunger means includes piston means slidably received in said chamber means, said chamber means including an inlet for fluid under pressure to bias said one end of said plunger means toward said corresponding cam rod.

19. The article transfer mechanism according to claim 18, wherein said means interconnecting said locating members with said feed plates includes a lever attached to each said locating member and having an end slidably and pivotally interengaged with the corresponding feed plate.

* * * * *